United States Patent [19]

Kingsley

[11] Patent Number: 4,842,320
[45] Date of Patent: Jun. 27, 1989

[54] VEHICLE EXTERIOR SUN VISOR

[75] Inventor: Richard J. Kingsley, North Bonneville, Wash.

[73] Assignee: Saturn Corporation, Tacoma, Wash.

[21] Appl. No.: 915,064

[22] Filed: Oct. 3, 1986

[51] Int. Cl.$^4$ .............................................. B60J 3/00
[52] U.S. Cl. .............................. 296/95.1; 296/97 A; 160/DIG. 3; D12/191
[58] Field of Search ............. D12/191; 296/97 A, 96, 296/95 Q, 95 R; 160/DIG. 3

[56] References Cited

U.S. PATENT DOCUMENTS

| Des. 252,680 | 8/1979 | Kingsley et al. | D12/191 |
| Des. 283,611 | 4/1986 | Kingsley | D12/191 |
| 2,534,763 | 12/1950 | Flavin | 296/95 R |
| 2,566,934 | 9/1951 | Dieterich | 296/95 R |
| 2,777,732 | 1/1957 | Walsh | 296/95 R |
| 3,379,467 | 4/1968 | Brush | 296/95 R |

FOREIGN PATENT DOCUMENTS 498617 12/1953 Canada ............................. 296/95 Q

OTHER PUBLICATIONS

Sears & Roebuck Catalog, Van, R. V., Trailer & Camping Equipment, 1986/1987, page attached, Sunvisor "S", Class 296 Pedder.
J. C. Whitney Catalog, 454D, Jan. 1985, p. 35, Class 290 Design.
Sears Catalog.

*Primary Examiner*—Dennis H. Pedder
*Attorney, Agent, or Firm*—Hughes, Cassidy & Multer

[57] ABSTRACT

An exterior visor for an automotive vehicle; the visor extending forward over the windshield of the vehicle. The visor includes a number of recessed air vents located in the upper surface of the visor and which are formed by transverse midwalls which are mounted between the front and rear edges of the visor, and by lengthwise extending sidewalls which are connected between the midwalls and the visor rear edge. The air cavities are further formed by individual floor members which extend rearward and upward from the bottom edges of the midwalls. Openings are formed in the midwalls to allow airflow between the bottom surface and top surface of the visor. Fasteners such as pop rivets are inserted through mounting tabs which extend rearward from the visor rear edge and through the cavity floors, to secure the visor to the vehicle above the windshield.

7 Claims, 3 Drawing Sheets

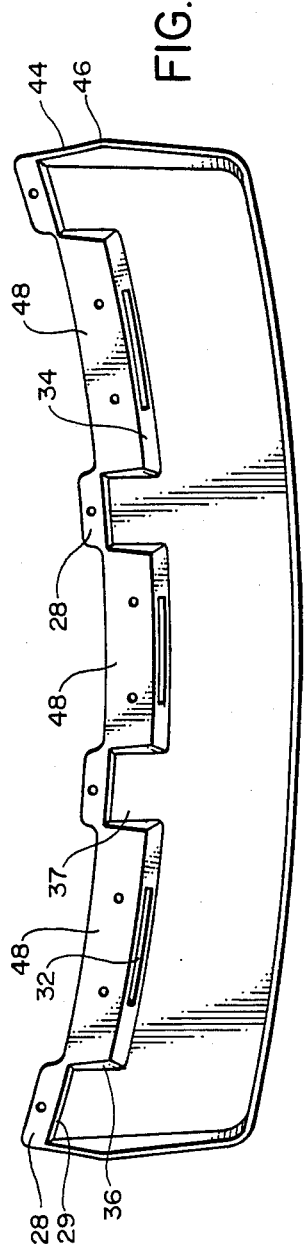
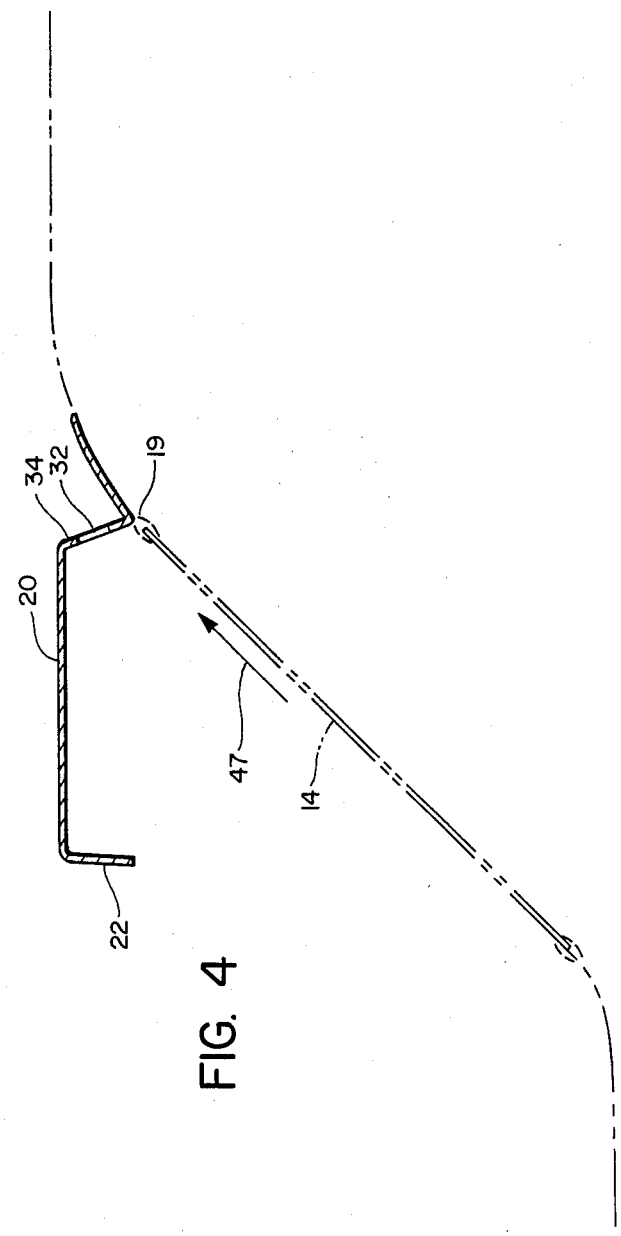
FIG. 3
FIG. 4

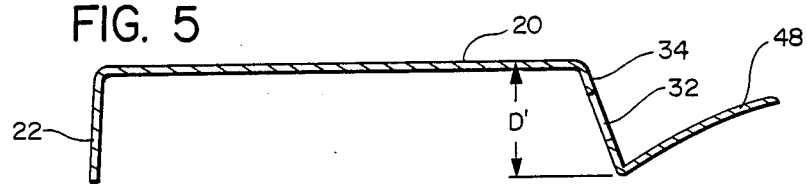
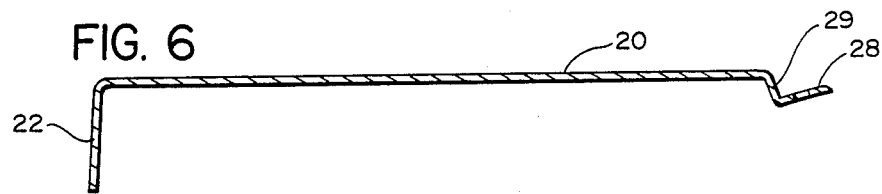
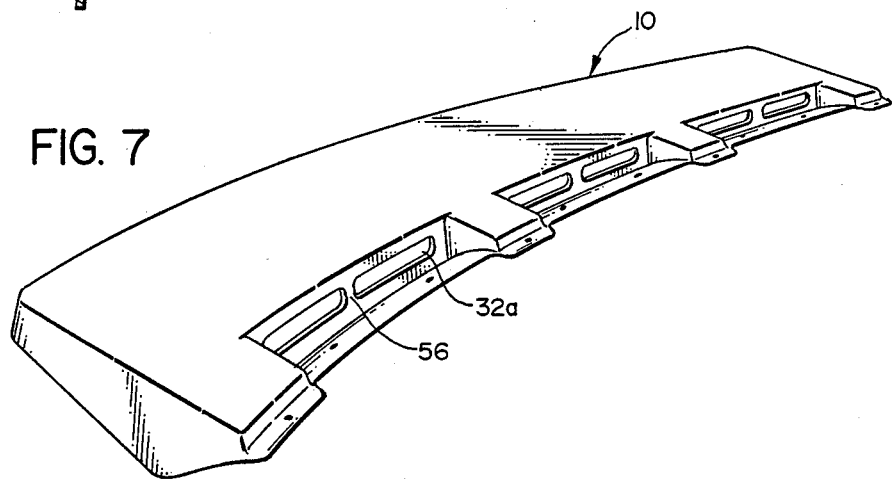
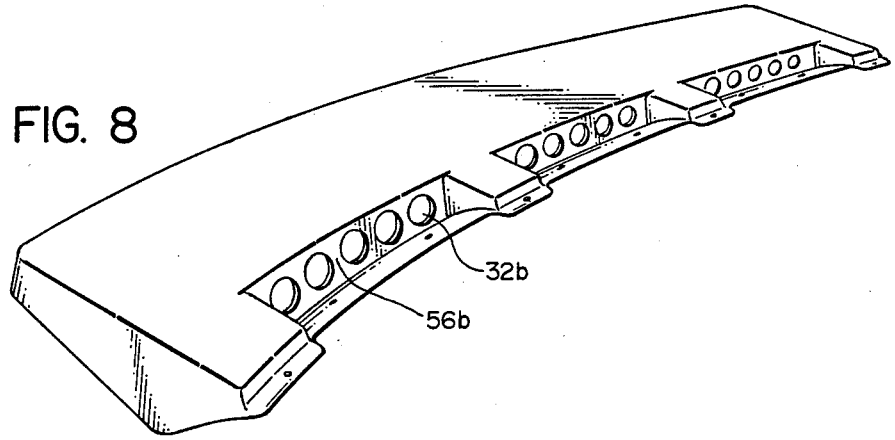

VEHICLE EXTERIOR SUN VISOR

TECHNICAL FIELD

The present invention pertains to an exterior sun visor which is mounted to a vehicle above the vehicle's front windshield.

BACKGROUND OF THE INVENTION

Exterior sun visors for vans and small trucks have become increasingly popular. These sun visors have an obvious functional purpose of helping to shade the vehicle passengers from the overhead rays of the sun. However, the increased popularity of the sun visors also can be attributed to a consumer desire to improve the vehicle appearance and styling.

Traditionally, small trucks and vans were used primarily as work vehicles for hauling large, cumbersome cargo which was unsuitable for transport by automobile. The consumer emphasis was upon durability and cargo carrying capacity, as well as upon those attributes of the vehicle which contributed to its operation as a cargo hauler. The use of these vehicles for personal transportation was usually secondary to their use as work vehicles.

More recently, however, small trucks and vans have been used more for both recreational activity and for family transportation. A typical subcompact pickup truck is often sold at a significant savings over a comparable automobile. This has led to the increased use of these small trucks in place of automobiles for person transportation. Furthermore, these vehicles are now being used for off road recreational activities as well as for family camping activities and they often are outfitted with sleeping accommodations as well as bathroom and kitchen facilities.

Because these vehicles are being used for both personal recreation and transportation, consumers have expressed a desire for them to look good; that is, to have styling features typically found in automobiles. This desire to have a good looking stylized vehicle has led to the production of specialized add-on equipment, like the sun visor, which provides a functional purpose, but which also improves the overall appearance of the vehicle.

The van and small truck have significant styling drawbacks, i.e. they have boxlike configurations; the van looking like a large rectangular box, with the pickup truck looking like three interconnected boxes formed by the engine compartment, passenger compartment and cargo compartment. An exterior sun visor which has a sleek, narrow profile provides a more sleek overall appearance to the vehicle.

Aside from achieving a design which is aesthetically pleasing, certain problems result from the incorporation of an exterior sun visor above the front windshield. Forward movement of the vehicle causes air buildup along the bottom surface of the visor due to airflow upward and across the front windshield. When traveling at high speeds, this air buildup, if not dissipated, can rip the visor from the vehicle. Furthermore, it is common among conventional exterior visors to experience what is known as "flutter". Flutter is caused by differences in air pressure across the lower surface of the visor which cause it to bend and twist in a rapid up and down manner. This flutter is not only distracting to the vehicle occupants, but it can also fatigue the visor at those locations where it is mounted to the vehicle and eventually cause it to fall off the vehicle.

A number of conventional exterior sun visors have been disclosed. For example, in U.S. Pat. No. 4,412,698 by Kingsley, there is provided an exterior sun visor having a transversely extending upper lip and downward extending left, right side edges for mounting the visor to the vehicle, and further having an air outlet between the lower surface and upper surface of the visor to relieve air pressure beneath the visor.

Other exterior sun visors have been disclosed in U.S. Des. Pat. No. 283,611 by Kingsley, and U.S. Des. Pat. No. 252,680 by Kingsley et al.

An exterior sun visor was also disclosed in Applicant's co-pending application, U.S. Ser. No. 849,012 filed Apr. 7, 1986 for "EXTERNAL VISOR FOR AUTOMOTIVE VEHICLES"; and in a design application entitled "VEHICLE EXTERIOR SUN VISOR", filed the same date as the present application as U.S. Ser. No. 915,321.

SUMMARY OF THE INVENTION

The present invention pertains to an exterior visor for a vehicle, and preferably an exterior visor for a truck or a van. The visor has a generally rectangular configuration and is formed by a top planar surface and transversely extending front and rear edges. The top surface includes a number of downward recessed air cavities, each of which is formed by a transverse midwall which is located between the forward and rear edges and which depends downward from the top surface, and by a pair of sidewalls which extend rearward from the midwall and which also depend downward from the top surface. In order to permit airflow between the bottom and top surfaces of the visor, a number of vent openings are provided in the midwalls. The air cavities are bounded on each side by a pair of rearward extensions which are formed by the cavity sidewalls and the rear edges of the visor. These extensions include mounting tabs at their rearward ends which engage the vehicle above the windshield and which have fasteners extending vertically through them.

The air cavities are further formed by floor members which extend upward and rearward from the bottom edges of the midwalls. The visor is secured to the vehicle by means of fasteners which extend vertically through the cavity floors and engage the vehicle. The cavity floors, in conjunction with the sides of the visor, perform the function of supporting the visor in a generally horizontal manner above the windshield.

It is an object of the present invention to provide a visor which is mounted to the exterior of a motor vehicle above the front windshield.

BRIEF DESCRIPTION OF THE DRAWINGS

These and other objects and advantages of the present invention will become more readily apparent upon reading the following Detailed Description and the attached Drawings in which:

FIG. 3 is a bottom isometric view of the visor;

FIG. 4 is a side sectional view of the visor attached to the vehicle above the front windshield;

FIG. 5 is a side sectional view of the visor taken along line 5—5 of FIG. 1;

FIG. 6 is a side sectional view of the visor taken along line 6—6 of FIG. 1;

FIG. 7 is an isometric rear view of a second embodiment of the visor; and,

FIG. 8 is an isometric rear view of a third embodiment of the visor.

Figure 1:
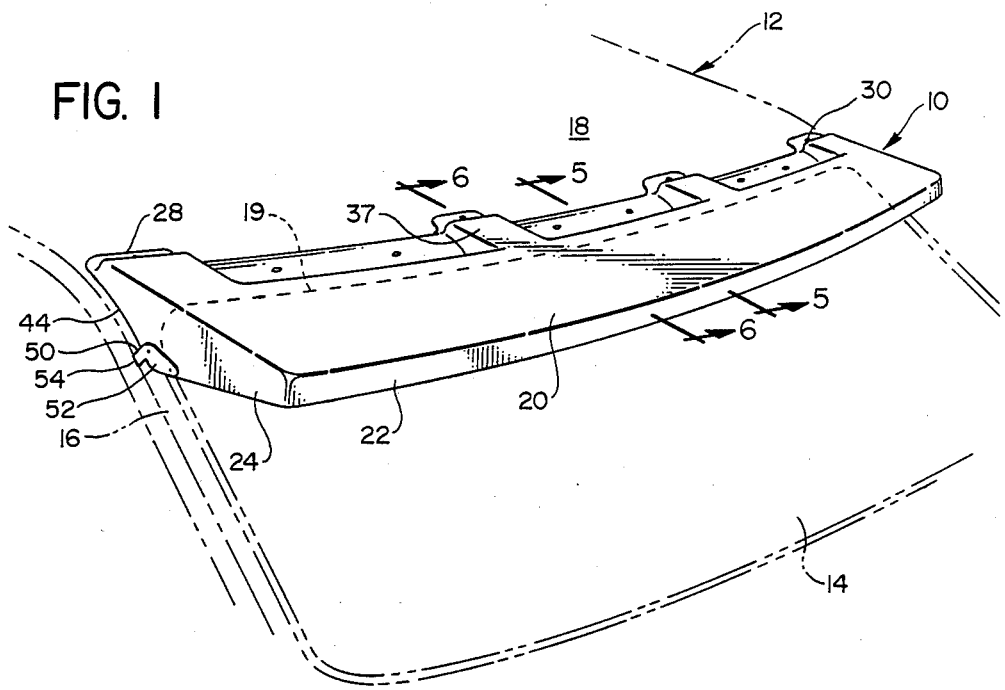
FIG. 1 is an front isometric view of the sun visor of the present invention attached to a vehicle above the front windshield.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the invention as expressed in the appended claims.

DETAILED DESCRIPTION

The present invention pertains to an exterior sun visor which is mounted above the front windshield of a motor vehicle. Referring to FIG. 1, there is shown the sun visor of the present invention indicated at 10, and which is mounted to a vehicle indicated at 12. The vehicle 12 includes a front windshield 14 which is framed by left and right strips 16 which extend downward and forward from a roof 18 of the automobile cab, and a top transverse portion 19 which extends downward and forward a short distance from the roof 18.

Figure 2:
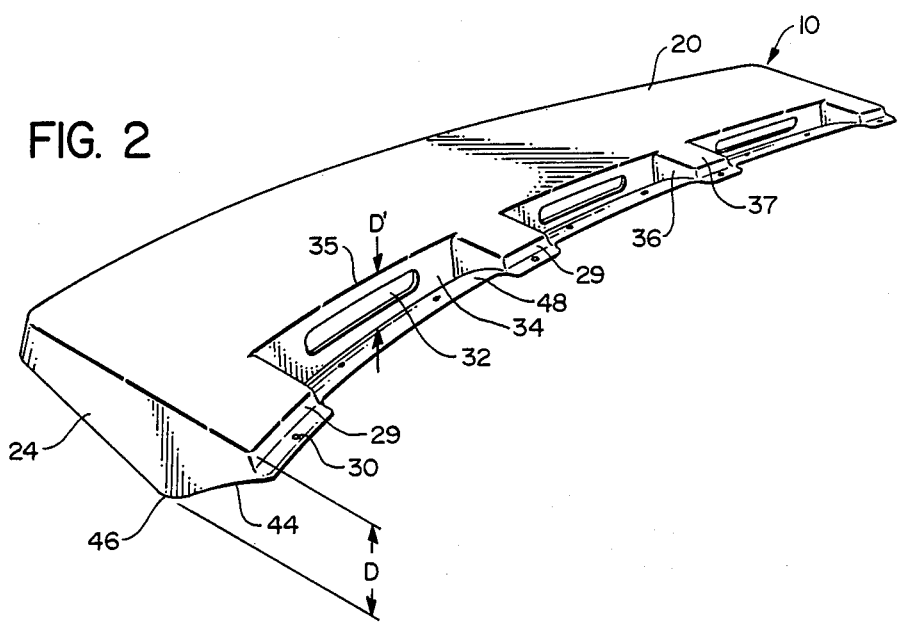
FIG. 2 is an isometric rear view of the sun visor of the present invention.

As shown in FIGS. 1 and 2, the visor 10 is made from a plastic material such as an acrylonitrile-butadiene-styrene copolymer (ABS), and is formed by a top rectangular surface 20 having a forward transverse extending edge portion 22 which depends downward from the visor forward edge. Visor 10 also includes left, right sides 24 which depend downward from the side edges of the top surface 20 and which engage the frame of the windshield to support the visor. In order to mount the visor to the cab roof 18, the visor includes a number of upper and rearward extending horizontal tabs 28 (FIG. 6) which are connected to a rear edge 29 of the visor. Pop rivets 30 (FIG. 1) extend generally vertically through the tabs 28 and into the windshield top frame portion 19 to secure the visor to the vehicle.

As shown more clearly in FIGS. 2 and 3, airflow passages are provided by vent openings 32 which extend laterally across a number of transverse midwalls 34, which in turn depend downward from top surface 20. In the present invention, the midwalls 34 are located forward of the rear edge 29 and rearward of front edge 22 to form recessed rectangular air cavities 35 in the visor top surface. Each air cavity 35 is formed by the transverse extending midwall 34, as well as left, and right sidewalls 36 which extend rearward from the midwall 34 and which depend downward from the top surface 20; the sidewalls 36 terminating at the rear edges 29. The sidewalls 36 and rear edges 29 form rectangular extensions 37 at the left and right sides of the air cavities 35.

In carrying out the present invention, the visor is mounted to the vehicle so that the mounting tabs 28 are engaged to the windshield frame top portion 19, and the visor top surface 20 extends forward of and slightly below the roof 18. In this manner, a continuous streamlined appearance is provided by the visor top surface 20 and cab roof 18. This is further accomplished by supporting the visor by means of bottom edges 44 of the left and right visor sides 24. The bottom edges 44 extend downward and forward from the rear edges 29 and engage the left, right frame strips 16 on either side of the windshield 14 so that the visor 10 is supported in a horizontal manner. The bottom edge 44 extends downward and forward to a lower point 46 and then upward and forward where it terminates at the visor forward edge 22. When supported in the aforementioned manner, the horizontal top surface 20 and bottom edge 44 converge somewhat in as they extend in the forward direction to give a streamlined appearance to the visor.

As shown more clearly in FIG. 4, when the visor is mounted to the vehicle as described above, the bottom edge of the midwall 34 engages the windshield frame top strip 19, and the midwall 34 forms an angle between about 70° and about 90° with the surface of the vehicle windshield 14. When the vehicle is moving in a forward direction, the resulting airflow travels across the vehicle hood and upwardly across the vehicle windshield as indicated by the arrow 47. The openings 32 in the midwalls 34 lie in the path of the airflow across the windshield thereby promoting a free flow of air between the bottom and top surfaces of the visor, and thusly minimizing the pressure buildup along the bottom surface of the visor.

Further support for the visor is provided by a number of air cavity floor members 48 (FIGS. 3 and 5) which extend upward and rearward from the bottom edges of the midwalls 34 in a manner generally parallel to the bottom edge 44; the midwalls 34 being generally transversely aligned with the lowermost points 46 of the visor sides 24. Each floor 48 extends laterally between adjacent sidewalls 36 and terminates at a rear edge which is transversely aligned with the visor rear edge 29. In this manner, the bottom of the floor 44 engages the windshield top frame portion 19 just above the front windshield (FIG. 4). Additional pop rivets 30 extend through the floor 48 and into the top frame portion 19 to fasten the visor above the windshield.

In order to further provide a streamlined appearance to the visor, a vertical dimension D (FIG. 2) between the top surface 20 and the lowermost point 46 on each side 24, is slightly grater than the vertical dimension D' between the top surface 20 and the bottom edge of midwall 34. Thus, the midwall 34 and the floor 48 are essentially hidden when viewing the visor from the side. Furthermore, the vertical dimension of the visor forward edge is slight greater than midwall vertical dimension D' so as to effectively hide from view the midwall 34 and floor 48 when looking from the front of the vehicle toward the rear. In addition, the top surface 20 of the visor is essentially flat and is characterized by the absence of any upward projections which would detract from the overall streamlined appearance. Thus, when looking at the visor along a plane essentially level with or below the top surface 20, the air cavities 35 are not observable, so that the top surface has the appearance of being a continuous uninterrupted planar surface. This further promotes the overall streamlined, modern appearance of the visor.

In order to reduce the pressure buildup beneath the visor 20, it is desirable to maximize the area of vent openings 32. This is accomplished in the present invention by locating the vent openings in the midwalls 34. The rear edges 29 have a relatively small vertical dimension which is directed by the desire to provide a streamlined narrow appearance at the interface of the visor with the vehicle. This narrow interface drastically reduces the area which would be available for the vent openings 32 in the rear edges 29. By locating the midwalls 34 forward of the rear edge 29, and by providing a larger midwall which is effectively hidden by the visor sides 24 and front edge 22, larger vent openings 32 are achieved without detracting from the visor's streamlined appearance. Furthermore, the presence of the midwalls 34, as well as the lengthwise extending cavity sidewalls 36 and the floors 48, provide additional strength to the visor. This increased strength is important to minimize the effects of flutter which tend to bend and twist the visor along its lengthwise axis.

It should be appreciated that the windshield 14 has a somewhat curved configuration along its lengthwise axis, with the frame side strips 16 being somewhat rearwardly recessed relative to the upper frame portion 19. Therefore, to provide a close mating fit between the visor and the vehicle, the cavity floors 48 have a somewhat curved configuration along the lengthwise axis of the visor.

In order to further secure the visor to the vehicle, there is also provided a pair of mounting brackets 50 (FIG. 1), each having a base 52 and an elongated portion 54. The base of each tab is riveted to the visor sides 24 at locations adjacent to the bottom edge 44, while the portion 54 is bent around the bottom edge 44 and inward toward the center of the windshield, and is attached to the windshield strip 16 by additional pop rivets.

As discussed previously, the visor 10 may be subjected to pressure distributions along its bottom surface which gives rise to forces which tend to cause the visor to flutter. While this flutter is significantly reduced by the aforementioned pressure relief air vents 32, and by the structural midwalls 34 and sidewalls 36, reduction in flutter is also achieved by further maximizing the strength of the visor, particularly along its lengthwise axis. In another embodiment shown in FIG. 7, a vertical structural member 56 separates the vent 32 into two smaller vents 32a which have a combined total area equal to the area of vent 32, but which have increased strength due to the presence of the vertical structural member 56.

In a third embodiment shown in FIG. 8, the vents are formed in the shape of circular openings 32b which have the same area as the vent openings 32, but which are separated by an increased number of vertical structural members 56b. It should be appreciated that there are numerous other vent configurations which provide increased structural integrity to the visor by increasing the number of vertical structural members 56.

What is claimed is:

1. An exterior visor for use with automotive vehicles of the type having a roof and a windshield bounded on three sides by left and right side frame members and the leading edge of the vehicle roof, said exterior visor comprising, in combination:
    (a) a generally flat, horizontal, transversely extending visor member having a top surface and a bottom surface, said visor member including:
        (i) an integral, transversely extending, depending, vertically oriented front edge member;
        (ii) an integral, transversely extending, discontinuous, depending, substantially vertically oriented rear edge member having respective discontinuous transversely spaced lowermost edges;
        (iii) a pair of integral, longitudinally extending, depending, vertically oriented side members at opposite ends of said visor member, each of said side members having a bottom edge with a rearmost end shaped to generally conform to the leading edge of the vehicle roof and to one of the side frame members bounding the windshield of the vehicle to which said exterior visor is attached; and,
        (iv) a rearwardly extending, generally horizontally disposed, first mounting flange integral with and extending rearwardly from each of said lowermost edges of said transversely extending, discontinuous, depending, substantially vertically oriented rear edge member for permitting anchoring of said exterior visor to the roof of an automotive vehicle;
    (b) said visor member having a plurality of transversely space, recessed air cavities formed therein intermediate said front and rear edge members, each of said air cavities being hidden from view by said front edge and side members, respectively, from the side and front of said exterior visor when mounted on a vehicle, each of said recessed air cavities being defined by:
        (i) a depending, transversely extending, vertically oriented midwall having a lowermost edge, opposed ends, and a vertical dimension equal to the vertical distance between said top surface of said visor member and said lowermost edge of said midwall, said midwall being integral with said visor member and located forward of said rear edge member and aft of said front edge member;
        (ii) a pair of transversely spaced, axially extending, vertically oriented, depending side walls each having a forward end and each being integral with said visor member and integrally attached at said forward end of each of said side walls to respective ones of said opposed ends of said midwall; and
        (iii) a rearwardly extending floor member integral with the lowermost edges of said transversely extending midwall and said pair of axially extending side walls, each of said floor members defining a transversely extending second mounting flange for permitting anchoring of said exterior visor to the vehicle roof of an automotive vehicle at points intermediate said rearwardly extending, generally horizontally disposed, first mounting flanges, and wherein said first and second mounting flanges are adapted to be mounted in flush face-to-face engagement with the vehicle roof across said transversely extending visor member;
    (c) through aperture defining means formed in each of said midwalls for permitting air movement therethrough and thus precluding pressure buildup beneath said exterior visor; and,
    (d) means for mounting said exterior visor to an automotive vehicle so that said visor member extends forward from the vehicle above the windshield thereof and in such a manner that each of said midwalls extends outwardly and upwardly from the windshield at an angle therewith.

2. An exterior visor for automotive vehicles as set forth in claim 1 wherein said integral, discontinuous, transversely extending, depending, substantially vertically oriented rear edge member is separated by said midwalls each having a vertical dimension (D′) between said top surface of said visor member and said lowermost edges of said discontinuous rear edge member; and, said aperture defining means formed in each of said midwalls define through apertures having a vertical dimension smaller than said last mentioned midwall vertical dimension (D').

3. An exterior visor for automotive vehicles as set forth in claim 1 wherein said side members each have a vertical dimension extending from said top surface of said visor member and said bottom edge of each of said side members, said vertical dimension of each of said side members being greater than said vertical dimension of said midwalls.

4. An exterior visor for automotive vehicles as set forth in claim 1 wherein said front edge member has a vertical dimension which is at least as great as the vertical dimension of said midwalls.

5. An exterior visor for automotive vehicles as set forth in claim 1 wherein said aperture defining means formed in each of said midwalls define a transversely extending through opening formed therein.

6. An exterior visor for automotive vehicles as set forth in claim 1 wherein said aperture defining means formed in each of said midwalls define a pair of transversely spaced, elongated through slots separated by an integral, vertically upstanding midwall portion defining a strengthening rib.

7. An exterior visor for automotive vehicles as set forth in claim 1 wherein said aperture defining means formed in each of said midwalls comprises a plurality of transversely spaced through openings formed therein.

* * * * *